(No Model.)
A. J. TAYLOR.
VEHICLE POLE COUPLING.
No. 499,404. Patented June 13, 1893.
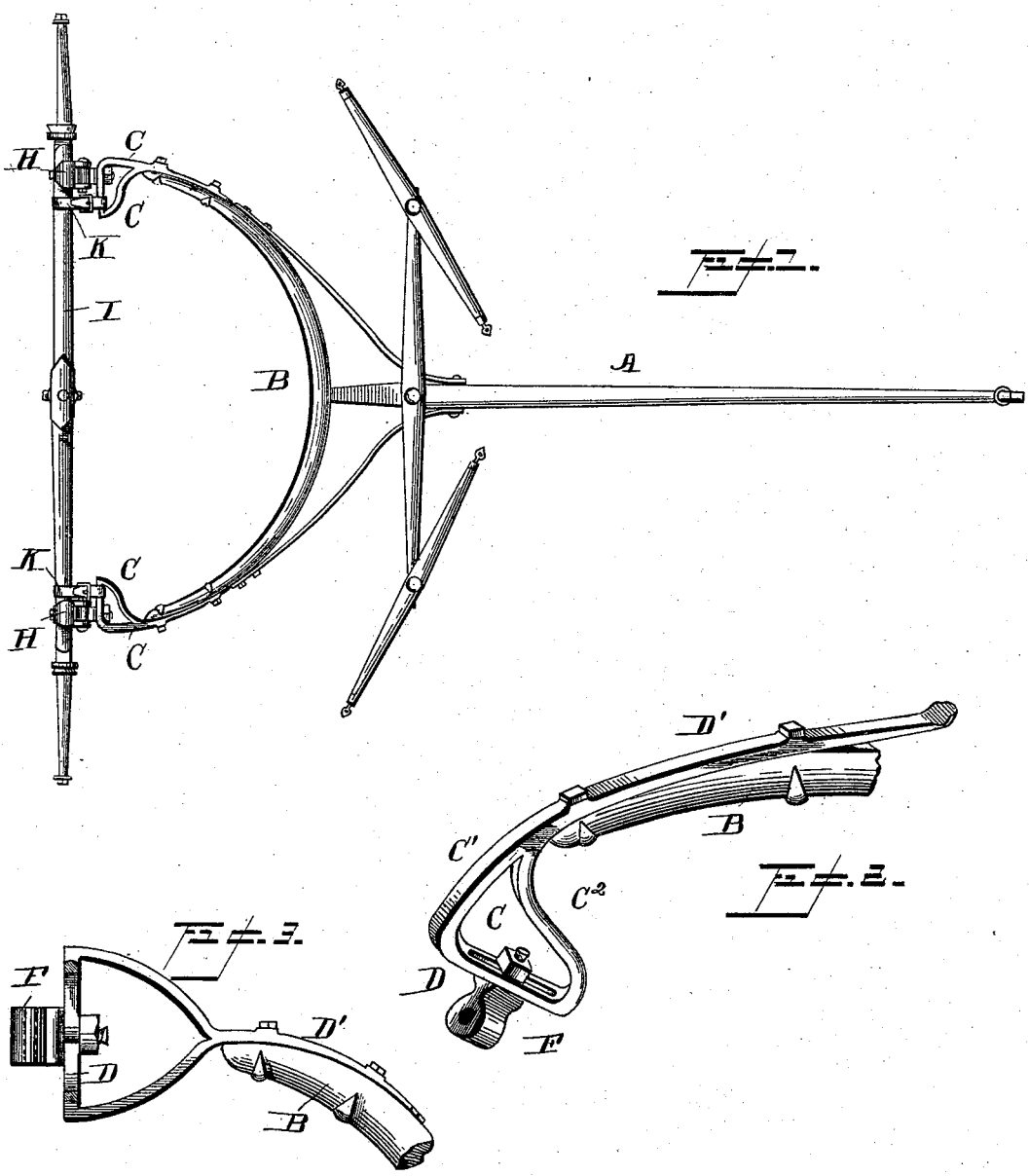
WITNESSES
INVENTOR
A. J. Taylor
By W. A. Bartlett
Attorney

UNITED STATES PATENT OFFICE.

ANDREW J. TAYLOR, OF GLENS FALLS, NEW YORK.

VEHICLE-POLE COUPLING.

SPECIFICATION forming part of Letters Patent No. 499,404, dated June 13, 1893.

Application filed February 13, 1893. Serial No. 462,197. (No model.)

*To all whom it may concern:*

Be it known that I, ANDREW JACKSON TAYLOR, residing at Glens Falls, in the county of Warren and State of New York, have invented certain new and useful Improvements in Pole and Thill Couplings for Vehicles, of which the following is a specification, reference being had therein to the accompanying drawings.

This invention relates to thill and pole coupling irons for carriages, wagons, and the like.

The object of the invention is to produce a thill and pole coupling which may be readily adjusted to the shackles of wagon axles, whether such shackles be of the precise width of the thills or spreader, or not; also, to produce a pole or shaft coupling which will not be likely to become accidentally detached.

Figure 1 is a plan view showing manner of connecting pole to axle with my improved coupling. Fig. 2 is a perspective detail of one of the couplings detached from the shackle. Fig. 3 is a broken plan, partly in section, of a coupling slightly modified.

A indicates the pole of a carriage or wagon, and B, the spreader thereof.

C, C, indicate coupling loops, which are attached to the ends of the spreader, or may be attached to thills in any convenient and usual way, as by screws or screw bolts.

The loop C is an important feature of the invention. This loop has a flat bar D, which has a slot or mortise extending lengthwise, and about parallel with the axle when the pole is attached thereto. The bar D is integral with and connected at both ends to the strap D', by which strap D' the loop is attached to the pole or thills. An eye bolt E passes through the slot in bar D, having a nut inside the loop. The end of the eye bolt is preferably headed down inside the loop after the nut is applied, thus permitting the eye bolt to be loosened and moved in the slot, but not permitting the nut to be removed from the bolt. The eye F of each eye bolt is passed between the knuckles of the shackle, H, when the pole is applied to axle I, and coupled by bolts passing through the knuckles and eyes, as is common. The eye bolts can be adjusted in the slots of bars D to fit the shackles arranged in any usual position on or relatively to the axle. As the bar D is connected at each end to the strap D', the loop has great strength, and as the eye bolt cannot be removed from the loop, (after the end is headed down over the nut) accidents are avoided, as well as the annoyance due to the loss of parts of the coupling. The loops C also form a convenient means for attaching the safety strap K, (see Fig. 1) which straps may be put at either side of the eye-bolts, according to the adjustment, and extend round the bar D and axle.

In Fig. 3 the loop is shown as formed of a slotted plate D connected to the strap D' about opposite the center of the forked connecting pieces, instead of at one side thereof, as in Figs. 1 and 2, so that when the eye-bolt is central in bar D there will be no twisting strain on the loop.

This coupling, if made with the slots in bar D about two inches long, may be readily attached to any axle having the shackles about the usual distance apart, as the range of adjustment would be four inches. Of course the slots may be longer or shorter. The strength and convenience of the device will be understood by skilled mechanics.

I have indicated slight modifications. I contemplate others within the scope of the claims.

What I claim is—

1. In a shaft coupling, the loop consisting of a slotted bar integral with and connected at both ends to the strap which connects to the shaft, pole, or spreader, and having an eye piece extending through the slotted bar.

2. The coupling loop consisting of a slotted bar permanently connected at both ends to the attaching strap, and having an eye-bolt extending through the slot with its nut inside the loop, and the end of the bolt headed down over the nut.

3. The shaft coupling, consisting of two slotted bars each integral with and connected at both ends to a strap attached to one shaft or end of spreader, the eye bolt passing through the slot in said bars, and the shackles connected to the eye bolts and axle, all combined substantially as described.

4. In a shaft coupling, the combination with the shaft or pole of the loops connected to the shackles as described, and the safety straps passing through the loops and around the axle, substantially as described.

In testimony whereof I affix my signature in presence of two witnesses.

ANDREW J. TAYLOR.

Witnesses:
JAMES M. ALLEN,
CHARLES F. KING.